(12) United States Patent
Fang et al.

(10) Patent No.: US 11,806,942 B2
(45) Date of Patent: Nov. 7, 2023

(54) METHOD FOR MANUFACTURING BIOMASS MOLDED FLOOR

(71) Applicant: JIANGSU KENTIER WOOD CO., LTD., Jiangsu (CN)

(72) Inventors: Yiqun Fang, Jiangsu (CN); Haixing Li, Jiangsu (CN); Junhua Zhang, Jiangsu (CN)

(73) Assignee: JIANGSU KENTIER WOOD CO., LTD., Jiangsu (CN)

(*) Notice: Subject to any disclaimer, the term of this patent is extended or adjusted under 35 U.S.C. 154(b) by 20 days.

(21) Appl. No.: 17/567,820

(22) Filed: Jan. 3, 2022

(65) Prior Publication Data
US 2022/0126525 A1    Apr. 28, 2022

(30) Foreign Application Priority Data
Sep. 17, 2021   (CN) .......................... 202111090327.9

(51) Int. Cl.
| | | |
|---|---|---|
| *B29D 99/00* | (2010.01) | |
| *B29C 59/00* | (2006.01) | |
| *B29C 59/02* | (2006.01) | |
| *B29C 65/00* | (2006.01) | |
| *B29C 65/48* | (2006.01) | |
| *B29L 7/00* | (2006.01) | |

(52) U.S. Cl.
CPC ............ *B29C 66/45* (2013.01); *B29C 59/005* (2013.01); *B29C 59/026* (2013.01); *B29C 65/4805* (2013.01); *B29C 66/7392* (2013.01); *B29C 66/7487* (2013.01); *B29D 99/0057* (2013.01); *B29L 2007/001* (2013.01); *B29L 2007/002* (2013.01)

(58) Field of Classification Search
CPC ......... B29L 2007/001; B29L 2007/002; B29C 43/02; B29C 69/00; B29C 66/45; B29C 59/005; B29C 59/026; B29C 65/4805; B29C 66/7392; B29C 66/7487; B29D 99/0057
See application file for complete search history.

(56) References Cited

U.S. PATENT DOCUMENTS

| | | | |
|---|---|---|---|
| 11,041,317 B2 * | 6/2021 | Tong ......................... | B32B 7/12 |
| 2018/0215069 A1 * | 8/2018 | Lewis ....................... | B32B 7/12 |
| 2018/0272558 A1 * | 9/2018 | Kalwa ..................... | B27N 3/002 |

FOREIGN PATENT DOCUMENTS

CN           104943327 A    *  9/2015

OTHER PUBLICATIONS

CN104943327A Machine Translation (Google) (Year: 2023).*

* cited by examiner

*Primary Examiner* — Cynthia L Schaller

(57) ABSTRACT

A method for manufacturing a biomass molded floor includes steps of: (1) preparing a PVC (polyvinyl chloride) board and a wood-plastic board, wherein a density of the wood-plastic board is in a range of 0.87-0.90 g/cm$^3$; (2) coating an upper surface of the wood-plastic board with an adhesive, bonding the wood-plastic board with the PVC board, wherein an area of the wood-plastic board is in a range of 1000 mm×1200 mm-1000 mm×1800 mm; and (3) performing molding after bonding, wherein parameters of the molding are: temperature in a range of 35-40° C., pressure in a range of 10-12 MPa, time in a range of 50-60 s.

6 Claims, 1 Drawing Sheet

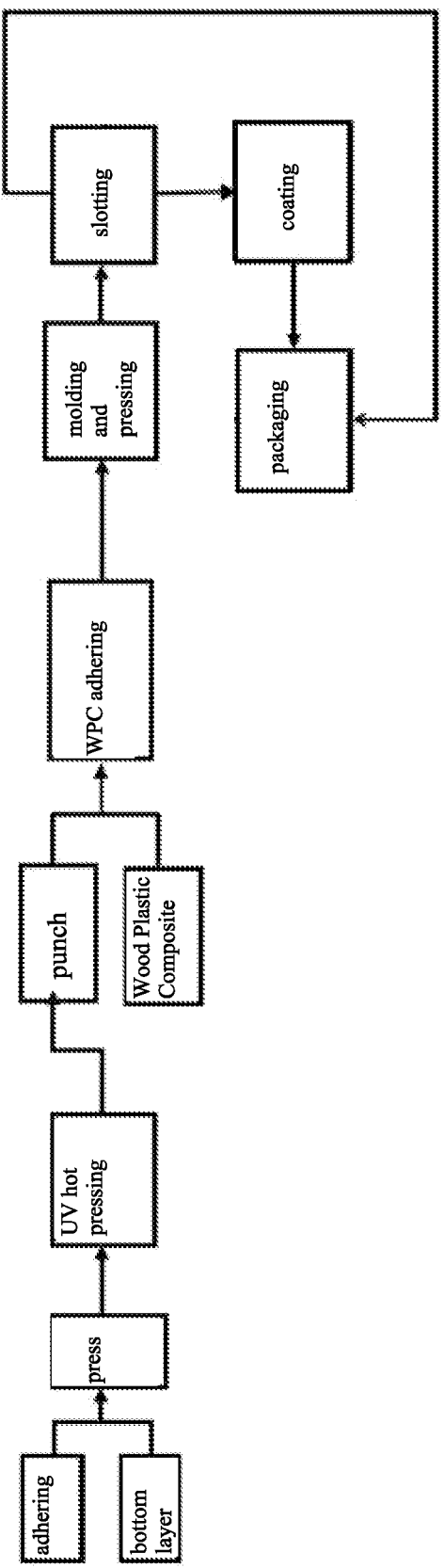

METHOD FOR MANUFACTURING BIOMASS MOLDED FLOOR

CROSS REFERENCE OF RELATED APPLICATION

The present application claims priority under 35 U.S.C. 119(a-d) to CN 202111090327.9, filed Sep. 17, 2021.

BACKGROUND OF THE PRESENT INVENTION

Field of Invention

The present invention relates to the technical field of wood-plastic composite floor, and more particularly to a method for manufacturing a biomass molded floor.

Description of Related Arts

WPC floor refers to floor made of a wood-plastic composite (WPC). Due to the characteristics of strong plasticity, recyclable resources, and low price, Since WPC floor has received extensive attention and application. However, The WPC floor in the conventional art has poor resistance to deformation, especially the high rebound rate of the molded plate, which not only affects the subsequent processing, but also affects the appearance of the product. In order to avoid the impact, small plates (190 mm×1200-1800 mm) molding are usually adopted, resulting in complex process and low processing efficiency.

SUMMARY OF THE PRESENT INVENTION

In order to solve the above technical problems in the conventional art, the purpose of the present invention is to provide a high-efficiency and energy-saving biomass molded floor production process and a manufacturing method therefor.

A method for manufacturing a biomass molded floor is provided by the present invention, comprising steps of:

(1) preparing a PVC (polyvinyl chloride) board and a wood-plastic board, wherein a density of the wood-plastic board is in a range of 0.87-0.90 g/cm$^3$;

(2) coating an upper surface of the wood-plastic board with an adhesive, bonding the wood-plastic board with the PVC board, wherein an area of the wood-plastic board is 1000 mm×1200 mm-1000 mm×1800 mm;

(3) performing molding after bonding, wherein parameters of the molding are: temperature in a range of 35-40° C., pressure in a range of 10-12 MPa, time in a range of 50-60 s; a single-piece floor is directly formed by molding, and a concave arc-shaped indentation is formed at surrounding edges of the single-piece floor are adjacent to edges.

Preferably, the adhesive is diphenylmethane diisocyanate.

Preferably, a coating amount of the adhesive is in a range of 50-90 g/m$^2$.

Preferably, the PVC board is made of PVC material, and the PVC material is made of the parts by weight of: 100 parts of PVC, 40-50 parts of light calcium carbonate, 35-45 parts of plasticizer, and 2-3 parts of calcium zinc stabilizer.

Preferably, the plasticizer is dioctyl terephthalate.

Preferably, the wood-plastic board is made of parts by weight of: 100 parts of PVC, 200-300 parts of plant fiber, 4.0-4.5 parts of stabilizer, 50-60 parts of light calcium carbonate, 0.4-0.45 parts of PE wax, internal lubrication 0.6-0.8 parts of AC foaming agent, 0.6-0.8 parts of AC foaming agent, 1.2-1.5 parts of NC foaming agent, 1.5-2.0 parts of lubricating processing aid, and 12.0-13.0 parts of foaming regulator.

Preferably, a wear-resistant layer is provided on the PVC board, and the wear-resistant layer and the PVC board are formed by hot pressing.

Preferably, a color film layer is provided between the wear-resistant layer and the PVC board.

Preferably, the wear-resistant layer is further coated with a UV paint layer.

Preferably, a pattern between the curvature of the molded single-piece floor and a main body of the panel is continuous, and after assembling, a whole large board is formed, so as to promote reflecting a sense of integrity and beauty after assembling.

Compared with the conventional arts, the method for manufacturing the biomass molded floor of the present invention has the following beneficial effects:

The manufacturing process of the biomass molded floor of the present invention can effectively reduce the rebound of the later molding depth by controlling the density and molding temperature and pressure of the wood-plastic board, realizes the large board molding, simplifies the process flow, and is easy to process and can guarantee The appearance quality improves the service life.

BRIEF DESCRIPTION OF THE DRAWINGS

The FIGURE is a flow chart of a method for manufacturing a biomass molded floor according to a preferred embodiment of the present invention

DETAILED DESCRIPTION OF THE PREFERRED EMBODIMENT

The method for manufacturing the biomass molded floor of the present invention will be described in detail below in conjunction with the accompanying drawings. The examples cited are only used to explain the present invention, not to limit the scope of the present invention. In the following paragraphs, the present invention is described in more detail by way of example with reference to the drawings.

The FIGURE shows a flow chart of the method for manufacturing the biomass molded floor of the present invention, which comprises following steps of:

1. Board Preparation:

(1) raw materials of a PVC board (base material) being made of the following parts by weight: 100 parts of PVC, 40-50 parts of light calcium carbonate (CaCO$_3$), 35-45 parts of plasticizer (such as dioctyl terephthalate) Ester DOTP), 2-3 parts of calcium zinc stabilizer, wherein the raw materials are mixed uniformly through a mixing system, and then performing banburying for 5-6 min, open smelting, calendering, cooling and shaping, traction, and cutting to obtain PVC board (bottom material);

(2) wood-plastic board being made of following parts by weight: 100 parts of PVC, 200-300 parts of plant fiber, 4.0-4.5 parts of stabilizer, 50-60 parts of light calcium carbonate, 0.4-0.45 parts of PE wax, 0.6-0.8 parts of internal lubricant, 0.6-0.8 parts of AC foaming agent, 1.2-1.5 parts of NC foaming agent, 1.5-2.0 parts of lubricating processing aid, 12.0-13.0 parts of foaming regulator, and evenly mixing the raw materials by the mixing system, then performing extrusion, plasticization, cooling, traction, and cutting to obtain wood-plastic panels; wherein a density of wood-plastic panels is controlled within 0.87-0.90 g/cm$^3$;

(3) hot pressing: laying the wear-resistant layer, color film, and bottom layer in turn, and sending in a hot press for hot pressing;

(4) performing UV coating on the semi-finished product after hot pressing to obtain an upper floor, wherein UV paint is applied to a surface of the wear-resistant layer to change the brightness and improve the wear resistance; coating the adhesive diphenylmethane on the wood-plastic board Diisocyanate MDI, wherein an coating amount is 50-90 g/m$^2$; then adhering the upper floor on the wood-plastic board, after cold rolling, punching, and slotting, a large board with a size of 1000 mm×(1300-1800 mm) is obtained;

(5) molding and pressing the large slab with a mold through pressure; wherein the process is formed at one time which eliminates the cutting process of cutting the large slab into small slabs, and meanwhile, makes the adjacent edges of the floor show a concave arc; indentation, a Y-shaped arc will be formed between each piece of floor after the entire surface is tiled, which looks three-dimensional and full; the molding process is performed with a temperature in a range of 35–40° C., a pressure in a range of 10-12 MPa, and a time in a range of 50-60 s;

(6) floor slotting, filming and packaging.

Example 1

1. Board Preparation:

(1) raw materials of a PVC board (base material) being made of the following parts by weight: 100 parts of PVC, 40 parts of light calcium carbonate (CaCO$_3$), 35 parts of Ester DOTP, 2 parts of calcium zinc stabilizer, wherein the raw materials are mixed uniformly through a mixing system, and then performing banburying for 5 min, open smelting, calendering, cooling and shaping, traction, and cutting to obtain PVC board (bottom material);

(2) wood-plastic board being made of following parts by weight: 100 parts of PVC, 200 parts of plant fiber, 4.0 parts of stabilizer, 50 parts of light calcium carbonate, 0.4 parts of PE wax, 0.6 parts of internal lubricant, 0.8 parts of AC foaming agent, 1.5 parts of NC foaming agent, 1.5 parts of lubricating processing aid, 12.0 parts of foaming regulator, and evenly mixing the raw materials by the mixing system, then performing extrusion, plasticization, cooling, traction, and cutting to obtain wood-plastic panels; wherein a density of wood-plastic panels is controlled at 0.87/cm$^3$;

(3) hot pressing: laying the wear-resistant layer, color film, and bottom layer in turn, and sending in a hot press for hot pressing;

(4) performing UV coating on the semi-finished product after hot pressing to obtain an upper floor, wherein UV paint is applied to a surface of the wear-resistant layer to change the brightness and improve the wear resistance; coating the adhesive diphenylmethane on the wood-plastic board Diisocyanate MDI, wherein an coating amount is 65 g/m$^2$; then adhering the upper floor on the wood-plastic board, after cold rolling, punching, and slotting, a large board with a size of 1000 mm×1500 mm is obtained;

(5) molding and pressing the large slab with a mold through pressure; wherein the process is formed at one time which makes the adjacent edges of the floor show a concave arc; indentation, a Y-shaped arc will be formed between each piece of floor after the entire surface is tiled, which looks three-dimensional and full, wherein the molding process parameter conditions is strictly controlled; the molding process is performed with a temperature of 36° C., a pressure in a range of 12 MPa, and a time of 60 s, so as to control the amount of rebound in the later stage;

(6) floor slotting, filming and packaging.

Example 2

1. Board Preparation:

(1) raw materials of a PVC board (base material) being made of the following parts by weight: 100 parts of PVC, 50 parts of light calcium carbonate (CaCO$_3$), 45 parts of Ester DOTP, 3 parts of calcium zinc stabilizer, wherein the raw materials are mixed uniformly through a mixing system, and then performing banburying for 6 min, open smelting, calendering, cooling and shaping, traction, and cutting to obtain PVC board (bottom material);

(2) wood-plastic board being made of following parts by weight: 100 parts of PVC, 200 parts of plant fiber, 4.5 parts of stabilizer, 60 parts of light calcium carbonate, 0.45 parts of PE wax, 0.8 parts of internal lubricant, 0.6 parts of AC foaming agent, 1.2 parts of NC foaming agent, 1.5 parts of lubricating processing aid, 12.0 parts of foaming regulator, and evenly mixing the raw materials by the mixing system, then performing extrusion, plasticization, cooling, traction, and cutting to obtain wood-plastic panels; wherein a density of wood-plastic panels is controlled at 0.90/cm$^3$;

(3) hot pressing: laying the wear-resistant layer, color film, and bottom layer in turn, and sending in a hot press for hot pressing;

(4) performing UV coating on the semi-finished product after hot pressing to obtain an upper floor, wherein UV paint is applied to a surface of the wear-resistant layer to change the brightness and improve the wear resistance; coating the adhesive diphenylmethane on the wood-plastic board Diisocyanate MDI, wherein an coating amount is 75 g/m$^2$; then adhering the upper floor on the wood-plastic board, after cold rolling, punching, and slotting, a large board with a size of 1000 mm×1500 mm is obtained;

(5) molding and pressing the large slab with a mold through pressure; wherein the process is formed at one time which eliminates the cutting process of cutting the large slab into small slabs, and meanwhile, makes the adjacent edges of the floor show a concave arc; indentation, a Y-shaped arc will be formed between each piece of floor after the entire surface is tiled, which looks three-dimensional and full; the molding process is performed with a temperature of 40° C., a pressure at 10 MPa, and a time is 60 s;

(6) floor slotting, filming and packaging.

Example 3

1. Board Preparation:

(1) raw materials of a PVC board (base material) being made of the following parts by weight: 100 parts of PVC, 45 parts of light calcium carbonate (CaCO$_3$), 40 parts of Ester DOTP, 2.5 parts of calcium zinc stabilizer, wherein the raw materials are mixed uniformly through a mixing system, and then performing banburying for 6 min, open smelting, calendering, cooling and shaping, traction, and cutting to obtain PVC board (bottom material);

(2) wood-plastic board being made of following parts by weight: 100 parts of PVC, 200 parts of plant fiber, 4.2 parts of stabilizer, 55 parts of light calcium carbonate, 0.42 parts of PE wax, 0.8 parts of internal lubricant, 0.7 parts of AC foaming agent, 1.3 parts of NC foaming agent, 1.5 parts of lubricating processing aid, 12.0 parts of foaming regulator, and evenly mixing the raw materials by the mixing system, then performing extrusion, plasticization, cooling, traction, and cutting to obtain wood-plastic panels; wherein a density of wood-plastic panels is controlled at 0.89/cm$^3$;

(3) hot pressing: laying the wear-resistant layer, color film, and bottom layer in turn, and sending in a hot press for hot pressing;

(4) performing UV coating on the semi-finished product after hot pressing to obtain an upper floor, wherein UV paint is applied to a surface of the wear-resistant layer to change the brightness and improve the wear resistance; coating the adhesive diphenylmethane on the wood-plastic board Diisocyanate MDI, wherein an coating amount is 70 g/m$^2$; then adhering the upper floor on the wood-plastic board, after cold rolling, punching, and slotting, a large board with a size of 1000 mm×1500 mm is obtained;

(5) molding and pressing the large slab with a mold through pressure; wherein the process is formed at one time which makes the adjacent edges of the floor show a concave arc; indentation, a Y-shaped arc will be formed between each piece of floor after the entire surface is tiled, which looks three-dimensional and full, wherein the molding process parameter conditions is strictly controlled; the molding process is performed with a temperature of 40° C., a pressure in a range of 12 MPa, and a time of 50 s;

(6) floor slotting, filming and packaging.

Example 4

1. Board Preparation:
(1) raw materials of a PVC board (base material) being made of the following parts by weight: 100 parts of PVC, 42 parts of light calcium carbonate (CaCO$_3$), 37 parts of Ester DOTP, 2.3 parts of calcium zinc stabilizer, wherein the raw materials are mixed uniformly through a mixing system, and then performing banburying for 6 min, open smelting, calendering, cooling and shaping, traction, and cutting to obtain PVC board (bottom material);

(2) wood-plastic board being made of following parts by weight: 100 parts of PVC, 200 parts of plant fiber, 4.3 parts of stabilizer, 60 parts of light calcium carbonate, 0.42 parts of PE wax, 0.8 parts of internal lubricant, 0.7 parts of AC foaming agent, 1.5 parts of NC foaming agent, 1.5 parts of lubricating processing aid, 12.0 parts of foaming regulator, and evenly mixing the raw materials by the mixing system, then performing extrusion, plasticization, cooling, traction, and cutting to obtain wood-plastic panels; wherein a density of wood-plastic panels is controlled at 0.88/cm$^3$;

(3) hot pressing: laying the wear-resistant layer, color film, and bottom layer in turn, and sending in a hot press for hot pressing;

(4) performing UV coating on the semi-finished product after hot pressing to obtain an upper floor, wherein UV paint is applied to a surface of the wear-resistant layer to change the brightness and improve the wear resistance; coating the adhesive diphenylmethane on the wood-plastic board Diisocyanate MDI, wherein an coating amount is 70 g/m$^2$; then adhering the upper floor on the wood-plastic board, after cold rolling, punching, and slotting, a large board with a size of 1000 mm×1500 mm is obtained;

(5) molding and pressing the large slab with a mold through pressure; wherein the process is formed at one time which makes the adjacent edges of the floor show a concave arc; indentation, a Y-shaped arc will be formed between each piece of floor after the entire surface is tiled, which looks three-dimensional and full, wherein the molding process parameter conditions is strictly controlled; the molding process is performed with a temperature of 40° C., a pressure in a range of 12 MPa, and a time of 50 s;

(6) floor slotting, filming and packaging.

Example 5

1. Board Preparation:
(1) raw materials of a PVC board (base material) being made of the following parts by weight: 100 parts of PVC, 40 parts of light calcium carbonate (CaCO$_3$), 35 parts of Ester DOTP, 2 parts of calcium zinc stabilizer, wherein the raw materials are mixed uniformly through a mixing system, and then performing banburying for 5 min, open smelting, calendering, cooling and shaping, traction, and cutting to obtain PVC board (bottom material);

(2) wood-plastic board being made of following parts by weight: 100 parts of PVC, 200 parts of plant fiber, 4.0 parts of stabilizer, 50 parts of light calcium carbonate, 0.4 parts of PE wax, 0.6 parts of internal lubricant, 0.8 parts of AC foaming agent, 1.5 parts of NC foaming agent, 1.5 parts of lubricating processing aid, 12.0 parts of foaming regulator, and evenly mixing the raw materials by the mixing system, then performing extrusion, plasticization, cooling, traction, and cutting to obtain wood-plastic panels; wherein a density of wood-plastic panels is controlled at 0.87/cm$^3$;

(3) hot pressing: laying the wear-resistant layer, color film, and bottom layer in turn, and sending in a hot press for hot pressing;

(4) performing UV coating on the semi-finished product after hot pressing to obtain an upper floor, wherein UV paint is applied to a surface of the wear-resistant layer to change the brightness and improve the wear resistance; coating the adhesive diphenylmethane on the wood-plastic board Diisocyanate MDI, wherein an coating amount is 65 g/m$^2$; then adhering the upper floor on the wood-plastic board, after cold rolling, punching, and slotting, a large board with a size of 1000 mm×1500 mm is obtained;

(5) molding and pressing the large slab with a mold through pressure; wherein the process is formed at one time which makes the adjacent edges of the floor show a concave arc; indentation, a Y-shaped arc will be formed between each piece of floor after the entire surface is tiled, which looks three-dimensional and full, wherein the molding process parameter conditions is strictly controlled; the molding process is performed with a temperature of 36° C., a pressure in a range of 12 MPa, and a time of 60 s, so as to control the amount of rebound in the later stage.

(6) floor slotting, filming and packaging.

Comparison 1

1. Board Preparation:
(1) raw materials of a PVC board (base material) being made of the following parts by weight: 100 parts of PVC, 40 parts of light calcium carbonate (CaCO$_3$), 35 parts of Ester DOTP, 2 parts of calcium zinc stabilizer, wherein the raw materials are mixed uniformly through a mixing system, and then performing banburying for 5 min, open smelting, calendering, cooling and shaping, traction, and cutting to obtain PVC board (bottom material);

(2) wood-plastic board being made of following parts by weight: 100 parts of PVC, 200 parts of plant fiber, 4.0 parts of stabilizer, 50 parts of light calcium carbonate, 0.4 parts of PE wax, 0.6 parts of internal lubricant, 0.8 parts of AC foaming agent, 1.8 parts of NC foaming agent, 1.5 parts of lubricating processing aid, 12.0 parts of foaming regulator, and evenly mixing the raw materials by the mixing system, then performing extrusion, plasticization, cooling, traction, and cutting to obtain wood-plastic panels; wherein a density of wood-plastic panels is controlled at 0.85/cm$^3$;

(3) hot pressing: laying the wear-resistant layer, color film, and bottom layer in turn, and sending in a hot press for hot pressing;

(4) performing UV coating on the semi-finished product after hot pressing to obtain an upper floor, wherein UV paint is applied to a surface of the wear-resistant layer to change the brightness and improve the wear resistance; coating the adhesive diphenylmethane on the wood-plastic board Diisocyanate MDI, wherein an coating amount is 65 g/m$^2$; then adhering the upper floor on the wood-plastic board, after cold rolling, punching, and slotting, a large board with a size of 1000 mm×1500 mm is obtained;

(5) molding and pressing the large slab with a mold through pressure; wherein the process is formed at one time wherein the molding process is performed with a temperature of 36° C., a pressure in a range of 12 MPa, and a time of 60 s, so as to control the amount of rebound in the later stage;

(6) floor slotting, filming and packaging.

Comparison 2

1. Board Preparation:

(1) raw materials of a PVC board (base material) being made of the following parts by weight: 100 parts of PVC, 50 parts of light calcium carbonate (CaCO$_3$), 45 parts of Ester DOTP, 3 parts of calcium zinc stabilizer, wherein the raw materials are mixed uniformly through a mixing system, and then performing banburying for 6 min, open smelting, calendering, cooling and shaping, traction, and cutting to obtain PVC board (bottom material);

(2) wood-plastic board being made of following parts by weight: 100 parts of PVC, 200 parts of plant fiber, 4.5 parts of stabilizer, 60 parts of light calcium carbonate, 0.45 parts of PE wax, 0.8 parts of internal lubricant, 0.5 parts of AC foaming agent, 1.0 parts of NC foaming agent, 1.5 parts of lubricating processing aid, 12.0 parts of foaming regulator, and evenly mixing the raw materials by the mixing system, then performing extrusion, plasticization, cooling, traction, and cutting to obtain wood-plastic panels; wherein a density of wood-plastic panels is controlled at 0.93/cm$^3$;

(3) hot pressing: laying the wear-resistant layer, color film, and bottom layer in turn, and sending in a hot press for hot pressing;

(4) performing UV coating on the semi-finished product after hot pressing to obtain an upper floor, wherein UV paint is applied to a surface of the wear-resistant layer to change the brightness and improve the wear resistance; coating the adhesive diphenylmethane on the wood-plastic board Diisocyanate MDI, wherein an coating amount is 75 g/m$^2$; then adhering the upper floor on the wood-plastic board, after cold rolling, punching, and slotting, a large board with a size of 1000 mm×1500 mm is obtained;

(5) molding and pressing the large slab with a mold through pressure; wherein the process is formed at one time wherein the molding process is performed with a temperature of 40° C., a pressure in a range of 10 MPa, and a time of 60 s;

(6) floor slotting, filming and packaging.

Comparison 3

1. Board Preparation:

(1) raw materials of a PVC board (base material) being made of the following parts by weight: 100 parts of PVC, 45 parts of light calcium carbonate (CaCO$_3$), 40 parts of Ester DOTP, 2.5 parts of calcium zinc stabilizer, wherein the raw materials are mixed uniformly through a mixing system, and then performing banburying for 6 min, open smelting, calendering, cooling and shaping, traction, and cutting to obtain PVC board (bottom material);

(2) wood-plastic board being made of following parts by weight: 100 parts of PVC, 200 parts of plant fiber, 4.2 parts of stabilizer, 55 parts of light calcium carbonate, 0.42 parts of PE wax, 0.8 parts of internal lubricant, 0.7 parts of AC foaming agent, 1.3 parts of NC foaming agent, 1.5 parts of lubricating processing aid, 12.0 parts of foaming regulator, and evenly mixing the raw materials by the mixing system, then performing extrusion, plasticization, cooling, traction, and cutting to obtain wood-plastic panels; wherein a density of wood-plastic panels is controlled at 0.89/cm$^3$;

(3) hot pressing: laying the wear-resistant layer, color film, and bottom layer in turn, and sending in a hot press for hot pressing;

(4) performing UV coating on the semi-finished product after hot pressing to obtain an upper floor, wherein UV paint is applied to a surface of the wear-resistant layer to change the brightness and improve the wear resistance; coating the adhesive diphenylmethane on the wood-plastic board Diisocyanate MDI, wherein an coating amount is 70 g/m$^2$; then adhering the upper floor on the wood-plastic board, after cold rolling, punching, and slotting, a large board with a size of 1000 mm×1500 mm is obtained;

(5) molding and pressing the large slab with a mold through pressure; wherein the process is formed at one time wherein the molding process is performed with a temperature of 35° C., a pressure in a range of 15 MPa, and a time of 50 s, so as to control the amount of rebound in the later stage;

(6) floor slotting, filming and packaging.

Comparison 4

1. Board Preparation:

(1) raw materials of a PVC board (base material) being made of the following parts by weight: 100 parts of PVC, 42 parts of light calcium carbonate (CaCO$_3$), 37 parts of Ester DOTP, 2.3 parts of calcium zinc stabilizer, wherein the raw materials are mixed uniformly through a mixing system, and then performing banburying for 6 min, open smelting, calendering, cooling and shaping, traction, and cutting to obtain PVC board (bottom material);

(2) wood-plastic board being made of following parts by weight: 100 parts of PVC, 200 parts of plant fiber, 4.3 parts of stabilizer, 60 parts of light calcium carbonate, 0.42 parts of PE wax, 0.6 parts of internal lubricant, 0.8 parts of AC foaming agent, 0.7 parts of NC foaming agent, 1.5 parts of lubricating processing aid, 12.0 parts of foaming regulator, and evenly mixing the raw materials by the mixing system, then performing extrusion, plasticization, cooling, traction, and cutting to obtain wood-plastic panels; wherein a density of wood-plastic panels is controlled at 0.88/cm$^3$;

(3) hot pressing: laying the wear-resistant layer, color film, and bottom layer in turn, and sending in a hot press for hot pressing;

(4) performing UV coating on the semi-finished product after hot pressing to obtain an upper floor, wherein UV paint is applied to a surface of the wear-resistant layer to change the brightness and improve the wear resistance; coating the adhesive diphenylmethane on the wood-plastic board Diisocyanate MDI, wherein an coating amount is 70 g/m$^2$; then adhering the upper floor on the wood-plastic board, after cold rolling, punching, and slotting, a large board with a size of 1000 mm×1500 mm is obtained;

(5) molding and pressing the large slab with a mold through pressure; wherein the process is formed at one time wherein the molding process is performed with a temperature of 50° C., a pressure in a range of 10 MPa, and a time of 50 s, so as to control the amount of rebound in the later stage;

(6) floor slotting, filming and packaging.

The WPC molded floors prepared in Examples 1-5 and Comparative Examples 1-4 were placed at a temperature of 60° C. for 6 hours to test the maximum rebound rate of the molded floors. The results are shown in Table 1:

TABLE 1

|  | E1 | E2 | E3 | E4 | E5 | C1 | C2 | C3 | C4 |
|---|---|---|---|---|---|---|---|---|---|
| Maximum rebound rate | 10 | 9 | 11 | 8 | 9 | 29 | 27 | 22 | 32 |

E1: Example 1; E2: Example 2; E3: Example 3; E4: Example 4; E5: Example 5;

C1: Comparison 1; C2: Comparison 2; C3: Comparison 3; C4: Comparison 4.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for manufacturing a biomass molded floor, comprising steps of:
   (1) preparing a PVC (polyvinyl chloride) board and a wood-plastic board, wherein a density of the wood-plastic board is in a range of 0.87-0.90 g/cm$^3$;
   (2) coating an upper surface of the wood-plastic board with an adhesive, bonding the wood-plastic board with the PVC board, wherein an area of the wood-plastic board is 1000 mm×1200 mm~1000 mm×1800 mm;
   (3) performing molding after bonding, wherein parameters of the molding are: temperature in a range of 35-40° C., pressure in a range of 10-12 MPa, time in a range of 50-60 s; a single-piece floor is directly formed by molding, and;
   wherein: the PVC board is made of PVC material, and the PVC material is made of parts by weight of: 100 parts of PVC, 40-50 parts of light calcium carbonate, 35-45 parts of plasticizer, and 2-3 parts of calcium zinc stabilizer.

2. The method for manufacturing a biomass molded floor, as recite in claim 1, wherein the plasticizer is dioctyl terephthalate.

3. A method for manufacturing a biomass molded floor, comprising steps of:
   (1) preparing a PVC (polyvinyl chloride) board and a wood-plastic board, wherein a density of the wood-plastic board is in a range of 0.87-0.90 g/cm$^3$;
   (2) coating an upper surface of the wood-plastic board with an adhesive, bonding the wood-plastic board with the PVC board, wherein an area of the wood-plastic board is 1000 mm×1200 mm~1000 mm×1800 mm;
   (3) performing molding after bonding, wherein parameters of the molding are: temperature in a range of 35-40° C., pressure in a range of 10-12 MPa, time in a range of 50-60 s; a single-piece floor is directly formed by molding;
   wherein the wood-plastic board is made of parts by weight of: 100 parts of PVC, 200-300 parts of plant fiber, 4.0-4.5 parts of stabilizer, 50-60 parts of light calcium carbonate, 0.4-0.45 parts of poly(ethylene) (PE)wax, internal lubrication 0.6-0.8 parts of AC foaming agent, 0.6-0.8 parts of Azodicarbonamide (AC) foaming agent, 1.2-1.5 parts of foaming agent, 1.5-2.0 parts of lubricating processing aid, and 12.0-13.0 parts of foaming regulator.

4. The method for manufacturing a biomass molded floor, as recite in claim 1, wherein a wear-resistant layer is provided on the PVC board, and the wear-resistant layer and the PVC board are formed by hot pressing.

5. The method for manufacturing a biomass molded floor, as recite in claim 4, wherein a color film layer is provided between the wear-resistant layer and the PVC board.

6. The method for manufacturing a biomass molded floor, as recite in claim 4, wherein the wear-resistant layer is further coated with a UV paint layer.

* * * * *